UNITED STATES PATENT OFFICE.

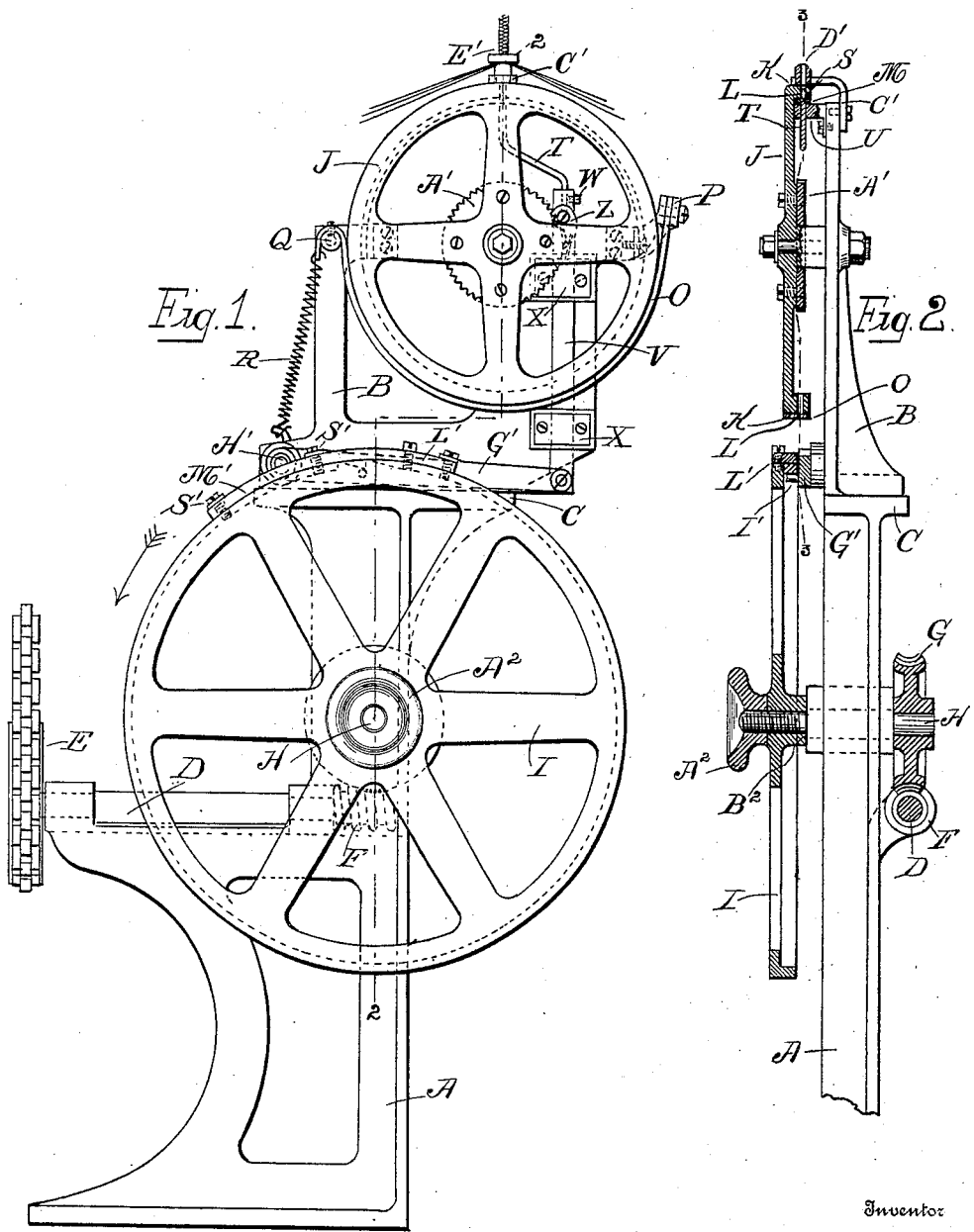

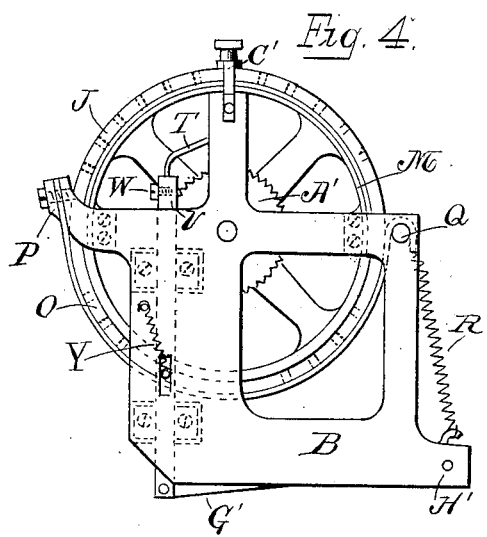
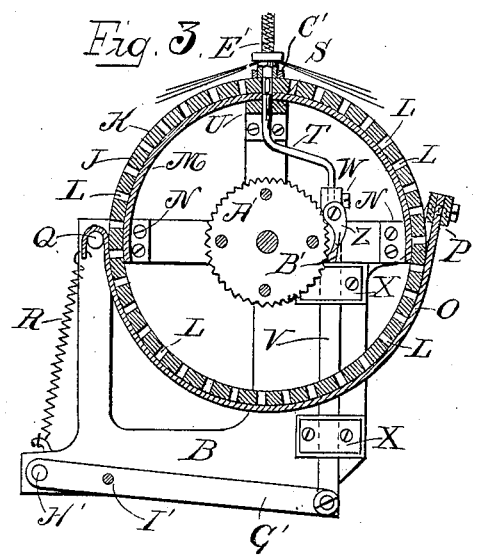
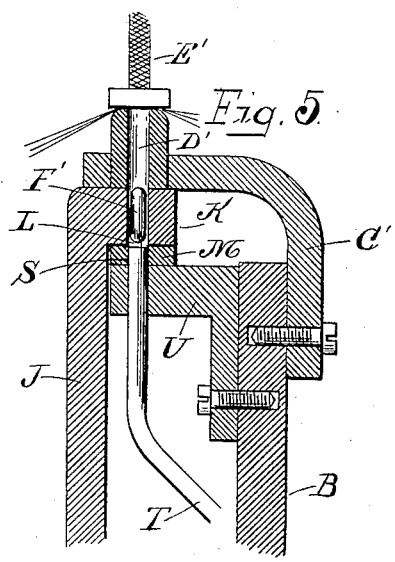
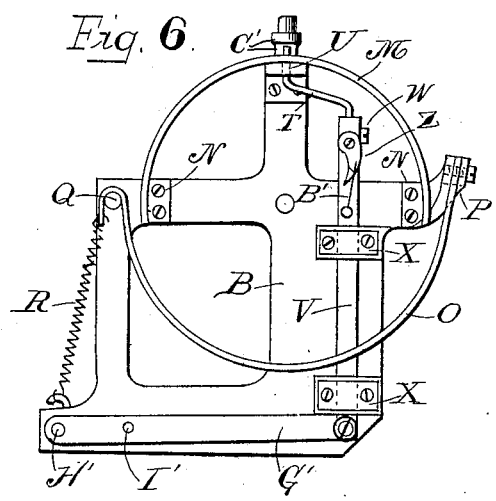

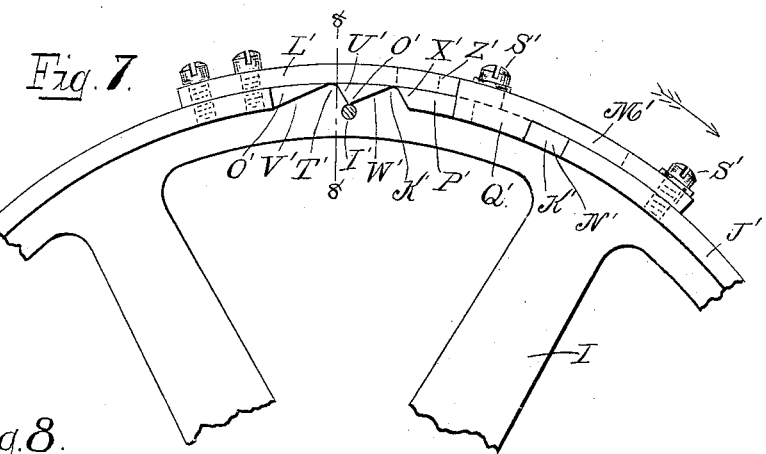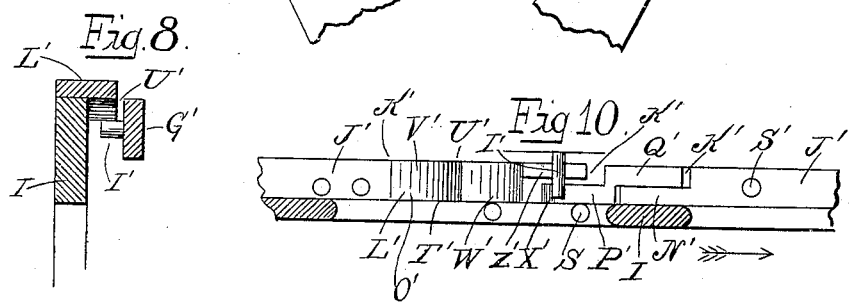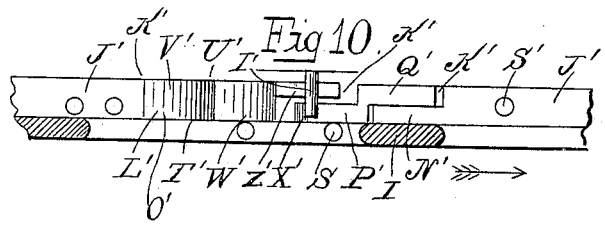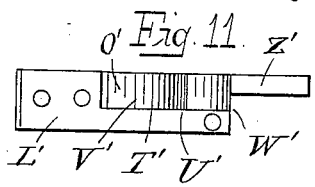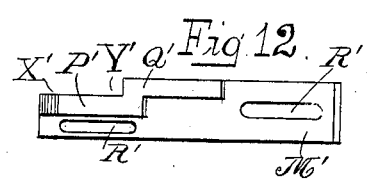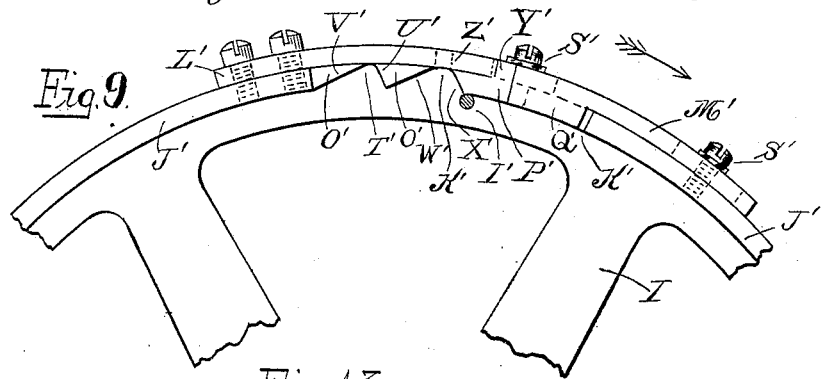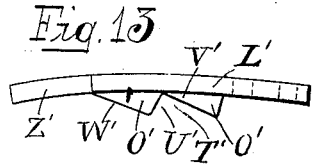

GEORGE ROWBOTTOM, OF WATERBURY, CONNECTICUT, ASSIGNOR TO ERNEST A. YOUNG, OF NEW HAVEN, CONNECTICUT.

BRAID-TIP-FEEDING MECHANISM.

No. 830,008.            Specification of Letters Patent.            Patented Sept. 4, 1906.

Application filed November 14, 1904. Serial No. 232,767.

*To all whom it may concern:*

Be it known that I, GEORGE ROWBOTTOM, of the city of Waterbury, county of New Haven, and State of Connecticut, have invented new and useful Improvements in Braid-Tip-Feeding Mechanism, of which the following is a full, clear, and accurate description when taken in connection with the accompanying drawings, which form a part thereof, and in which—

Figure 1 represents a front elevation of a machine embodying my invention; Fig. 2, a transverse vertical section on lines 2 2 of Fig. 1; Fig. 3, a vertical section of the upper portion of the machine on lines 3 3 of Fig. 2; Fig. 4, a rear elevation of the upper portion of the machine; Fig. 5, an enlarged detail view of the upper end of the plunger and associated parts, as shown in Fig. 2; Fig. 6, a front elevation of the upper portion of the mechanism with the dial and ratchet wheels removed; Fig. 7, a detail rear view of the cam-plates and associated parts of the operating-wheel; Fig. 8, a transverse section on line 8 8 of Fig. 7; Fig. 9, a view similar to Fig. 7, the cam-plates being shown slightly separated; Fig. 10, a bottom view of the same parts in the positions shown in Fig. 9; Figs. 11 and 12, bottom views of the cam-plates, and Fig. 13 a front elevation of one of the cam-plates.

In all figures similar letters of reference represent like parts.

This invention relates to machines for feeding the tips of shoe-laces or other braids into the braid during the process of braiding, and has for its object the production of a machine which will accurately feed a tip into the braid at regulated intervals without interference with the process of forming the braid; and to this end it consists in the several improvements and combinations of parts set forth and claimed hereinafter.

Referring to the drawings for a more particular description, the part designated by the letter A represents the base or standard of the machine, and B the support for the upper portion of the machine adapted to rest on the table portion C of the standard A.

Rotatably mounted on the standard A is a shaft D, having at one end a sprocket E or other suitable gear or pulley for transmitting motion to the shaft D from the braiding-machine, if desired. The shaft D carries a worm F, meshing with a worm-wheel G, mounted on a shaft H, which latter shaft carries an operating-wheel I.

On the upper support B is rotatably mounted a dial-wheel J, having a lateral peripheral flange K, provided with a series of radial perforations or holes L, Figs. 2, 3, and 5. Each of these perforations L is adapted to receive a tip of some such type as suggested in Letters Patent of the United States, No. 727,530, granted May 5, 1903, to Ernest A. Young, for insertion in a braid or shoe-lacing as it is braided or formed. The tips are held within the perforations of the flange K when the perforations are above the horizontal diameter of the dial-wheel J by means of a semicircular band M, of metal or other suitable material, secured at its ends N to the support B and adapted to fit against the under side of this half of the flange, as shown more particularly in Figs. 3 and 6. To hold the tips in the perforations L when they are below the horizontal diameter of the dial-wheel J, a ribbon or band O, of leather or similar suitable material, is secured at one end to the support B by means of a clamp P or other means, and passing beneath the flange of the dial-wheel J and over a stud Q on the opposite end of the support B is attached to a tension-spring R, fastened to the support B. The ribbon O thereby not only acts as a retaining-band, but also as a friction device on the dial-wheel J, and by changing the tension of spring R the friction of the ribbon on the dial-wheel J may be increased or diminished, as desired.

The band M is perforated at S, and into this perforation the end of a wire plunger T projects. The plunger T has a bearing in a bracket U on the support B and is adjustably secured on a slide V by a screw W or other suitable means. The slide V is secured to the support B by brackets X, which permit the slide vertical movement therein. On the back of the support B is a spring Y, secured at one end to the support B and at the other to a pin on the slide V, projecting through a slot in the support, to normally draw the slide upward.

A pawl Z is pivoted on the slide V to engage on the retraction or downward movement of the slide a tooth of a ratchet-wheel A', rigidly secured by screws or other means to the dial-wheel J. A spring B' bears on the pawl Z to keep it in engagement with the ratchet-wheel. Extending upward from the support B is a bracket C', which projects laterally over the flange K of the wheel J and is provided with a perforation D'. Over the upper end of the perforation D' of the bracket C' the threads of the braid are adapted to be drawn together by the braiding-machine to form a tubular braid which as finished passes upward, as indicated at E', Figs. 1, 3, and 5.

In operation a series of tips, of rubber or other suitable material, are inserted in the perforations L of the flange K of the dial-wheel J, and upon the rotation of the dial-wheel each of the perforations in succession comes into a position between the perforations S in the band M and D' in the bracket C', so that the inclosed tip is brought in alinement with the end of the plunger, as shown at F' in Fig. 5.

At the right moment in the process of braiding the slide V and plunger T, which are controlled by mechanism engaged by the wheel I, as described hereinafter, are released and the spring Y will protract them upward. The end of the plunger upon its protraction will force the tip upward out of its perforation into and partially through the perforation D', where it will be engaged by the threads as they are worked into the braid. Upon the reverse movement or retraction of the plunger and slide to return them to their normal positions the pawl Z engages a tooth of the ratchet-wheel A', thereby rotating the ratchet-wheel and dial-wheel J sufficiently to bring the next succeeding perforation L with its inclosed tip in line with the end of the plunger T. The tension of the ribbon or band O prevents the dial-wheel J from being rotated too far by the impetus of the pawl Z or accidentally by other means.

The lower end of the slide V is pivotally connected to a lever G', fulcrumed at H' to the support B. A laterally-projecting lug I' on the lever G' is engaged by a peripheral flange J' on the operating-wheel I, so that the lever is constantly held in the position shown in Figs. 1 and 3, wherein the slide V is drawn downward by the lever G' against the tension of the spring Y.

As shown in Fig. 10, the flange J' of the operating-wheel I is slotted or cut away at K' for the insertion of two cam-plates L' and M'. At one end of the slot is a shoulder or step-like formation N', Fig. 10. The cam-plate L' is rigidly secured at one end by screws or other means on the top of the flange J' and is provided with depending protuberances or shoulders O', which project downward through the slotted or cut-away portion K' of the flange J'. The end of one depending shoulder O' fits against the flange J' and forms a continuation thereof, Figs. 7 and 9.

The cam-plate M' is secured to the flange J' at the other end of the slot K' and has depending shoulders or protuberances P' and Q', adapted to project downward into the slot K'. The shoulders P' and Q' are adapted to fit around the step-like shoulder N' of the slot K', as shown more particularly in Fig. 10. The cam-plate M' is provided with a slot or slots R', through which project the screws S' to bind it adjustably to the top of the wheel I. Between the depending shoulders O' is a transverse groove T', one edge U' of which is curved sharply upward and the other edge V' inclined gradually downward, Figs. 7 and 9. The end W' of the other depending shoulder O' is chamfered or inclined, while the corresponding end X' of the depending shoulder P' of the other cam-plate M' is curved sharply upward in manner similar to the curved surface U'. The cam-plate M' is cut away at Y' and the cam-plate L' is provided with a projection Z' to fit in the cut-away portion Y' when the two cam-plates are in juxtaposition, Fig. 7.

The two cam-plates L' and M' form adjustable cams in connection with the flange J' in the operating-wheel I, for by means of the slots R' the cam-plate M' is adjustable longitudinally on the flange J', so that the curved end X' of the shoulder P' may be located close to the inclined surface W', as shown in Fig. 7, or separated therefrom, as shown in Fig. 9.

The stud I' on the lever G' is constantly drawn upward (by the spring Y' controlling the slide V) against the under side of the flange J' on the wheel I. The wheel I rotates in the direction indicated by the arrow, Figs. 1, 7, 9, and 10. When upon its rotation the slot K' comes above the stud I', the end of the slot having the shoulder N' first reaches the stud, and the shoulder N' continues to hold the stud down against the tension of the spring Y. Before the shoulder N' has passed from above the stud I' the shoulder Q' engages it and continues to hold it down until the shoulder P' engages it. When the end X' of the shoulder P' comes above the stud I', the stud may be drawn up the curved surface X' by the spring Y, which movement allows the plunger T to be protracted at the rate of travel of the stud I' on the curved surface X', and the protraction of the plunger, as already explained, inserts a tip into the braid. If the two cam-plates are in the position shown in Figs. 9 and 10, the stud I' will come under and in contact with the projection Z' of the cam-plate L', which, as shown particularly in Fig. 9, is in a plane above the flange J', and while the stud is against the projection Z' the plunger T is allowed to remain protracted.

As the inclined surface W' of the cam-plate L' passes over the stud I' the lever G' and slide V are forced downward against the tension of the coiled spring Y and the plunger T is gradually retracted; but, as already shown, upon the downward movement of the slide V the pawl Z engages the ratchet-wheel A' to rotate it and the wheel J to which it is rigidly connected a sufficient distance to bring the next succeeding perforation L of the flange K of the dial-wheel J into alinement with the plunger T.

When the cam-plate L' upon the rotation of the operating-wheel I brings the curved surface U' over the stud I' of the lever G', the stud I' is again released and slide V and plunger T are again protracted by spring Y to repeat the operation of inserting a tip into the braid.

The inclined surface V' of cam-plate L' forces the stud I' downward and retracts the slide V and plunger T, and the dial-wheel J is again partially rotated by the ratchet A' and pawl Z to bring a new perforation in line with the plunger.

If the cam-plates L' and M' are in the position shown in Fig. 7 when the stud I' controlling the movement of the plunger T has been released by the surface X', it is almost immediately engaged by the inclined surface W' and the plunger retracted. This reduces the interval of time between the movement when the stud I' is released by the surfaces X' and U', so that the plunger T is protracted and the two successive tips inserted in the braid in more rapid succession.

The machine described is adapted for inserting tips in shoe-lacings, (or kindred objects,) wherein a continuous braid is formed and two tips are inserted in close proximity. By severing the braid between the two tips two ends of separate braids are formed with their respective tips. By means of the sprocket wheel or gearing E the speed of rotation of the operating-wheel I may be regulated in conjunction with the mechanism for forming the braid, (not shown,) so that a revolution is completed and two tips may be inserted in rapid succession after any desired length of braid has been formed—as, for example, after a yard or a yard and a half has been made. In case a shorter length of braid is desired the speed of rotation of the operating-wheel I must be increased to make a revolution during the braiding of a shorter length of braid; but in order that the two tips shall not be inserted too closely the cam-plate M' is made adjustable on the wheel I, as already shown, so that, as particularly indicated in Fig. 9, the cam-plate M' may be drawn away somewhat from the cam L'. This change of position of cam-plate M' brings the curved surface X', (which permits the insertion of the first tip,) as already described, further removed from the curved surface U', (which permits the insertion of the second tip.) If, on the other hand, the speed of the spider-wheel I is slackened, the cam-plate M' may be moved toward the cam-plate L', so that the curved surfaces X' and U' are nearer together, as shown in Fig. 7.

The curved surfaces X' and U' are so proportioned that the stud will be released at a prescribed rate of speed, and therefore the plunger T force the tip upward into the braid at a proper speed proportioned to the speed at which the braid is formed.

The operating-wheel I is mounted on the shaft H and held rigidly thereon by means of the hand-set A², which forces it against a shoulder B² on the shaft H. By loosening the hand-set A² the wheel may be turned independently of the shaft H, so that the cams may be brought where they will engage the stud I' after any desired interval. This adjustment is important in case the braid should break and it is desired to set the machine so that one or two of the tips may be inserted immediately after the machine is put in operation at the beginning of a new braid.

As the speed of the feeding-machine may be regulated in connection with the braiding mechanism and the tips inserted at regulated intervals, the machine performs the function of a measuring device.

Having now described my invention, which may vary in its details without departing from the spirit thereof, what I claim, and desire to secure by Letters Patent, is—

1. In a braid-tip-feeding apparatus, or kindred instrumentality, the combination with a device for engaging a partially-formed braid; of means for presenting a tip for insertion longitudinally into the braid; and mechanism for projecting said tip into the braid while the braid is being formed, substantially as described.

2. In a braid-tip-feeding apparatus, or kindred instrumentality, the combination with a device for engaging a partially-formed braid; of means for presenting tips in succession for insertion into the braid; and mechanism for projecting the tips successively into said braid while said braid is being formed, substantially as described.

3. In a braid-tip-feeding apparatus, or kindred instrumentality, the combination with a device for engaging a partially-formed braid; of means presenting tips in succession for insertion into the braid; and mechanism for projecting said tips at regulated intervals into said braid, substantially as described.

4. In a braid-tip-feeding apparatus, or kindred instrumentality, the combination with a device for engaging a partially-formed braid; of means for presenting a tip for insertion into the braid; and mechanism for projecting said tip into the braid and for regulating the time of movement of said projecting mechanism, substantially as described.

5. In a braid-tip-feeding apparatus, or kindred instrumentality, the combination with a device for engaging a braid; of means presenting a tip longitudinally for insertion into the braid; a plunger adapted to force said tip into the braid; and mechanism for operating said plunger, substantially as described.

6. In a braid-tip-feeding apparatus, or kindred instrumentality, the combination with a device for engaging a braid; of means for successively presenting tips longitudinally for insertion into the braid; a plunger adapted to force said tips into the braid; and mechanism for operating said plunger at regulated intervals, substantially as described.

7. In a braid-tip-feeding apparatus, or kindred instrumentality, the combination with a device for engaging a braid; of means for presenting a tip longitudinally for insertion into the braid; a plunger adapted to force said tip into the braid; and mechanism for operating said plunger and for regulating the time of movement of said operating mechanism, substantially as described.

8. In a braid-tip-feeding apparatus, or kindred instrumentality, the combination with a device for engaging a braid; of a dial-wheel carrying a series of tips; means for rotating said dial-wheel to present said tips successively for insertion into the braid; a plunger adapted to force said tip when so presented into the braid; and mechanism for operating said plunger and rotating said dial-wheel, substantially as described.

9. In a braid-tip-feeding apparatus, or kindred instrumentality, the combination with a device for engaging a braid; of a dial-wheel carrying a series of tips and adapted upon its rotation to present said tips in succession for insertion into the braid; a plunger adapted upon its protraction to force said tips when so presented into the braid; means for rotating said dial-wheel upon the retraction of said plunger; and mechanism for operating said plunger, substantially as described.

10. In a braid-tip-feeding apparatus, or kindred instrumentality, the combination with a device for engaging a braid; of means for presenting tips longitudinally for insertion into the braid; a plunger adapted upon its protraction to force said tips when so presented into the braid; means for holding said plunger in its protracted position; and mechanism for releasing and protracting said plunger, substantially as described.

11. In a braid-tip-feeding apparatus, or kindred instrumentality, the combination with a device for engaging a braid; of means for presenting tips longitudinally for insertion into the braid; a plunger adapted upon its protraction to force said tips when so presented into the braid; a spring for protracting said plunger; means for holding said plunger against the tension of said spring; and mechanism for releasing said plunger, substantially as described.

12. In a braid-tip-feeding apparatus, or kindred instrumentality, the combination with a dial-wheel, having a series of perforations; a plunger adapted upon its protraction to enter one of said perforations in alinement therewith, and upon its retraction to rotate said wheel to bring another perforation in alinement; mechanism for operating said plunger, substantially as described.

13. In a braid-tip-feeding apparatus, or kindred instrumentality, the combination with a dial-wheel, having a series of perforations adapted to receive tips; of a stationary band adapted to hold said tips in said perforations in said wheel during a part of its revolution; and mechanism for operating said dial-wheel, substantially as described.

14. In a braid-tip-feeding apparatus, or kindred instrumentality, the combination with a dial-wheel having a series of perforations adapted to receive tips; of a stationary band adapted to hold said tips in said perforations in said wheel during a part of its revolution; a plunger adapted upon its protraction to enter one of said perforations in alinement therewith; and mechanism for operating said wheel and plunger, substantially as described.

15. In a braid-tip-feeding apparatus, or kindred instrumentality, the combination with a dial-wheel having a series of perforations adapted to receive tips; of a yielding band bearing on said wheel to hold said tips in said perforations in said wheel during a part of its revolution; and mechanism for operating said wheel, substantially as described.

16. In a braid-tip-feeding apparatus, or kindred instrumentality, the combination with a device for engaging a braid; of means for presenting a tip for insertion in the braid; a plunger adapted upon its protraction to insert said tip in the braid; an operating-wheel adapted to hold said plunger in its retracted position and also to release the same; and mechanism for operating said plunger and rotating said wheel, substantially as described.

17. In a braid-tip-feeding apparatus, or kindred instrumentality, the combination with a device for engaging a braid; of means for presenting a tip for insertion in the braid; a plunger adapted upon its protraction to insert said tip in the braid; an operating-wheel adapted to hold said plunger in its retracted position and also release the same; means for protracting said plunger when released; and mechanism for operating said wheel, substantially as described.

18. In a braid-tip-feeding apparatus, or kindred instrumentality, the combination with a plunger; means for yieldingly holding said plunger in its protracted position; an operating-wheel adapted to hold said plunger in its retracted position; a plurality of cam-plates secured to said wheel adapted to release said plunger; and mechanism for rotating said wheel, substantially as described.

19. In a braid-tip-feeding apparatus, or kindred instrumentality, the combination with a plunger; means for yieldingly holding said plunger in its protracted position; an operating-wheel adapted to hold said plunger in its retracted position; a plurality of adjustable cam-plates secured to said wheel adapted to release said plunger; and mechanism for rotating said wheel, substantially as described.

20. In a braid-tip-feeding apparatus, or kindred instrumentality, the combination with a plunger; means for yieldingly holding said plunger in its protracted position; an operating-wheel having a flange; mechanism for controlling the movement of said plunger engaged by said flange; a portion of said flange being broken away to release said mechanism; and means for rotating said wheel, substantially as described.

21. In a braid-tip-feeding apparatus, or kindred instrumentality, the combination with a plunger; means for yieldingly holding said plunger in its protracted position; an operating-wheel having a flange; mechanism for controlling the movement of said plunger engaged by said flange; a portion of said flange being broken away to form an opening; a plurality of cam-plates adapted to fit over said opening, and to release said plunger-controlling mechanism; and means for rotating said wheel, substantially as described.

22. In a braid-tip-feeding apparatus, or kindred instrumentality, the combination with a plunger; means for yieldingly holding said plunger in its protracted position; an operating-wheel having a flange; mechanism for controlling the movement of said plunger engaged by said flange; a portion of said flange being broken away to form an opening; a plurality of cam-plates adapted to fit over said opening to release said plunger-controlling mechanism, said cam-plates being adjustable in their relation with each other; and means for rotating said wheel, substantially as described.

23. In a braid-tip-feeding apparatus, or kindred instrumentality, the combination with a device for engaging a braid; of means for presenting tips in succession for insertion into the braid; a plunger adapted upon its protraction to insert said tips when so presented into the braid; an operating-wheel controlling the movement of said plunger; means for adjusting said wheel; and mechanism for operating said wheel and plunger, substantially as described.

In witness whereof I have hereunto set my hand on the 9th day of November, 1904.

GEORGE ROWBOTTOM.

Witnesses:
J. M. GALLOND,
M. J. NOONAN.